United States Patent [19]

Siegmund

[11] 4,391,621

[45] Jul. 5, 1983

[54] METHOD OF MAKING LENSES HAVING A SPHERICAL FACE

[75] Inventor: Walter P. Siegmund, Woodstock, Conn.

[73] Assignee: American Optical Corporation, Southbridge, Mass.

[21] Appl. No.: 246,551

[22] Filed: Mar. 23, 1981

[51] Int. Cl.³ .................. C03C 15/02; C03C 19/00
[52] U.S. Cl. .......................... 65/31; 65/3.15; 65/3.2; 65/61; 65/105; 51/284 R
[58] Field of Search ............ 65/3.15, 3.2, 13, 21.5, 65/31, 61, 64, 105; 51/284 R

[56] References Cited

U.S. PATENT DOCUMENTS

| | | | |
|---|---|---|---|
| 2,980,957 | 4/1961 | Hicks, Jr. ........................ | 65/13 X |
| 3,004,368 | 10/1961 | Hicks, Jr. ........................ | 65/31 X |
| 3,037,241 | 6/1962 | Bazinet, Jr. et al. ............ | 65/13 X |
| 3,624,816 | 11/1971 | Strack et al. ................... | 65/31 X |
| 3,653,739 | 4/1972 | Strack ........................... | 65/3.15 X |
| 3,901,718 | 8/1975 | Wu ................................ | 501/46 |
| 3,989,495 | 1/1976 | Siegmund ....................... | 65/31 |
| 4,071,343 | 11/1978 | Siegmund ....................... | 65/31 X |
| 4,231,775 | 11/1980 | Siegmund ....................... | 65/31 X |
| 4,251,251 | 2/1981 | Blankenship .................... | 65/13 X |

Primary Examiner—Richard V. Fisher
Attorney, Agent, or Firm—Alan H. Spencer

[57] ABSTRACT

A lens is formed of a section of glass clad glass rod ground and polished to a spherical shape of radius of curvature equal to that desired of a face of the lens. Remaining leachable cladding glass is removed leaving the lens with finished spherically curved opposite ends and an adaptability to modification by transaxial cutting and flat face finishing for plano-convex applications.

7 Claims, 13 Drawing Figures

METHOD OF MAKING LENSES HAVING A SPHERICAL FACE

BACKGROUND OF THE INVENTION

1. Field of the Invention:

This invention relates to the manufacture of lenses, more particularly those of exceptionally small sizes.

2. Discussion of the Prior Art:

Micro-lenses are presently difficult and expensive to manufacture especially in connection with the process of edging to small diameters, e.g. of 1.0 mm or less. The making of small spheres of glass for providing desired lens surface curvatures can be readily accomplished by the well-known technique of ball-bearing type grinding and polishing (lapping). However, edging the balls to less than spherical diameter becomes tedious and expensive.

Accordingly, a principal object of this invention is to overcome the usual tediousness and high cost of manufacturing miniature lenses, more particularly by avoidance of lens edging operations.

Another object is to accomplish the above with reliability of accurate lens duplication and in a manner allowing mass production.

Other objects and advantages of the invention will become apparent from the following description.

SUMMARY OF THE INVENTION

Objects of the invention are accomplished with provision of a glass preform comprising a core of lens glass in rod form which is clad with a compatible leaching glass. The preform is zonally heated and drawn to a size rendering the rod diameter equal to that desired of micro-lenses to be produced.

Sections of the draw are then cut to lengths approximately equalling the overall diameter of the drawn rod and cladding and ground and polished in ball-bearing fashion to a spherical curvature equalling that desired of opposite faces of the ultimate lenses. Remaining leachable glass is removed, leaving elongated double convex lenses. Intermediate transaxial cutting and flat face finishing provides plano convex lenses.

Details of the invention will become more readily apparent from the following description when taken in conjunction with the accompanying drawings.

IN THE DRAWINGS

DESCRIPTION OF THE PREFERRED EMBODIMENTS

Figure 1:
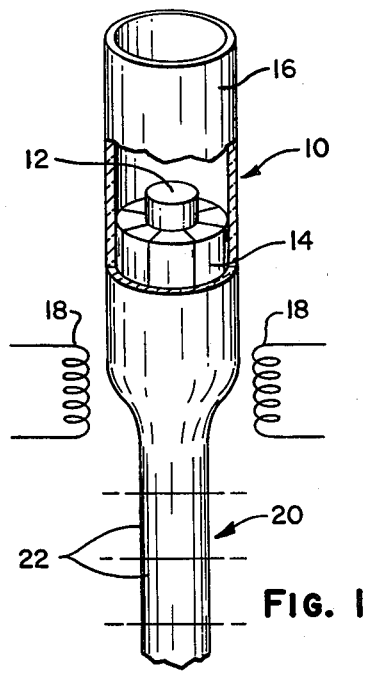
FIG. 1 illustrates an assembly of materials and preliminary operations for making lenses according to the present invention.

According to the invention, the manufacture of small lenses (e.g. of 1.0 mm diameter or less) is accomplished with an initial assembly of materials such as preform 10 (FIG. 1). With the possibility of numerous variations of the preform structure as will become apparent hereinafter, the arrangement illustrated in FIG. 1 includes central rod 12 of glass having the desired properties for the lenses. This rod is surrounded by a thick wall of acid soluble glass 14 and an outer container tube 16 of compatible glass. The latter allows a vacuum to be used to improve the conditions for fusing and drawing the rod 12 and glass 14 assembly. It may, however, be eliminated if drawing without vacuum is decided upon or when glass 14 is provided in tubular form rather than the illustrated staves.

The assembly of preform 10 is directed longitudinally through zone heating means, e.g. heating coils 18, and drawn as illustrated to a reduced cross-sectional size of radial dimension slightly larger than desired of the ultimate lens surface curvature. The draw 20 may be annealed, if desired. Those interested in details of drawing operations such as the above may refer to U.S. Pat. Nos. 2,980,957; 3,037,241; and 3,989,495.

Figure 2:
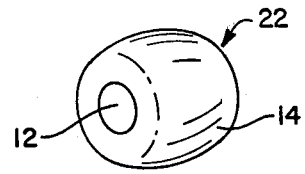
FIGS. 2 and 3 are illustrations of further operations useful in practice of the invention.

Draw 20 is next transaxially cut into sections 22 of lengths slightly greater than the draw diameter and each is ground or otherwise worked into a roughly spherical form as illustrated in FIG. 2. This may be accomplished by tumbling with loose abrasives in a ball mill, for example. Material of tube 16, if used, is at least partially removed by this operation thereby exposing the major portion, if not all, of the soluble glass 14 and opposite ends of rod 12.

Figure 3:
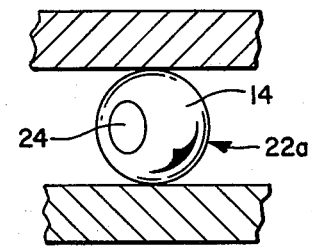
Figure 4:
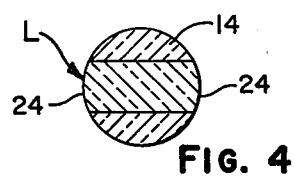
FIG. 4 is a cross-sectional view of a partially completed lens.

Grinding and polishing of the roughly spherical sections 22 into accurate spheres 22a (FIG. 3) is next undertaken. The well-known "lapping" technique for finishing ball bearings may be used, e.g. as illustrated in FIG. 3. This produces oppositely disposed spherical lens faces 24 (FIGS. 3 and 4) upon lens glass 14 which will be referred to hereinafter as lens L.

Figure 5:
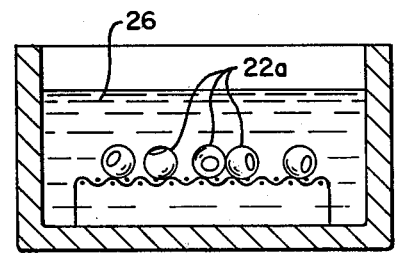
FIGS. 5 and 6 illustrate completion of the lens of FIG. 4.

Spherical sections, i.e. balls 22a, are next exposed to a leaching medium for removal of remaining soluble glass 14 and completion of lens L. This may be accomplished by immersion of sections 22a in a leaching solution 26 (FIG. 5) for a period of time sufficient to remove the glass 14. This is illustrated with broken lines in FIG. 6.

Figure 6:
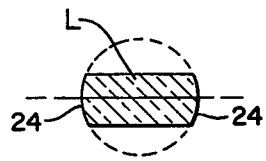
Figure 7:
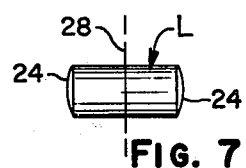
FIG. 7 is an elevational view of the completed lens.
Figure 8:
FIG. 8 is a similar elevational view of a modification of the lens of FIG. 7.

The remaining lens L in each case being of double convex form (i.e. having spherical faces 24 as shown in FIGS. 6 and 7) may be cut transaxially such as along line 28 to produce one or a pair of plano-convex lenses $L_1$ (FIG. 8). In such case, each flat face 30 will be optically polished in usual fashion. Face 30 may be differently shaped if desired.

It should be understood that the glasses used in practice of the above invention may comprise any of a variety of suitable commercially available compositions. For example, a typical glass for small lenses such as are used in endoscopes is identified commercially as Schott Type BK-7 supplied by Schott Glass, Inc., Duryea, Pa. U.S.A. Useful soluble (leachable) glasses may be selected from compositions disclosed in U.S. Pat. Nos. 3,004,368; 3,624,816; and 3,653,739.

Other glasses and combinations thereof will become readily apparent to those skilled in the art.

Figure 9:
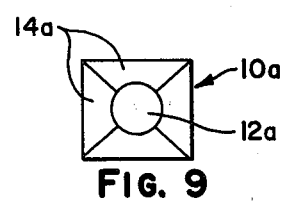
FIG. 9 is a modified form of materials assembly from which lenses may be produced according to the invention.
Figure 10:
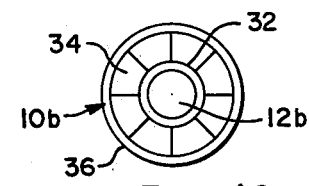
FIG. 10 is still another form of materials assembly.
Figure 11:
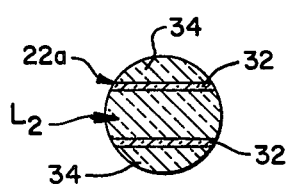
FIG. 11 illustrates, in cross-section, a partially finished lens resulting from use of the assembly of FIG. 10.
Figure 12:
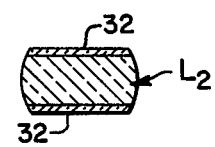
FIG. 12 is a cross-sectional view of the lens shown in FIG. 11 after completion according to the invention.
Figure 13:
FIG. 13 illustrates a modification of the FIG. 12 lens.

FIG. 9 illustrates a modified preform 10a which may be substituted for preform 10. Here, a rectangular configuration of glasses can be used to produce square sections for working into the shape of balls. The assembly comprising a rod 12a of lens glass is clad with triangular sections 14a of soluble glass.

A further modification of the invention is illustrated in FIGS. 10-13. Lenses $L_2$ and $L_3$ are produced from preform 10b which includes core 12b of lens glass, tube 32 of a light-absorbing glass, a surround 34 of leachable glass and an outer holding tube 36. Staves of light-absorbing glass may be substituted for tube 32.

As in the case of preforms 10 and 10a, all glasses 12b, 32, 34 and 36 (FIG. 10) are selected for compatibility of expansion coefficients and softening temperatures so that preform 10b can be zone heated and drawn in a manner similar to that of preform 14 (FIG. 1). Once drawn to the extent of bringing lens glass 12b to desired lens size and working into spherical sections 22a, lens $L_2$ (FIG. 12) is finished by leaching away glass 34 leaving light-absorbing glass 32 in place. Glass 32 prevents unwanted reflections from the edges of lens $L_2$.

Suitable light-absorbing glasses are disclosed in U.S. Pat. No. 3,901,718.

In a manner similar to the making of Lens $L_1$ above, clad lens $L_2$ may be transaxially cut and optically finished as lens $L_3$ (FIG. 13), for example.

Those skilled in the art will readily recognize that various modifications and adaptations of the precise forms of the invention described above may be made to suit particular requirements and, accordingly, it is intended that all such modifications which incorporate the present novel concept are to be construed as coming within the scope of the following claims or the range of equivalency to which they are entitled in view of the prior art.

I claim:

1. A method of making lenses comprising the steps of:
    assembling a preform of glasses including a rod of lens glass and a surrounding cladding of leachable glass, said rod being of greater diametral size than desired of said lenses;
    heating and drawing the preform to such a reduced cross-sectional size as to bring said rod to the diameter desired of said lenses;
    cutting said drawn preform transaxially into a number of sections of lengths approximately equally the drawn preform diameter;
    grinding said sections into spherical configurations of radii of curvature equalling that desired of at least one face of each of said lenses;
    removing remaining leachable glasses from said sections whereby rod glasses each having at least one spherical face comprise said lenses; and
    polishing said spherical faces of said lenses at a stage of said method following said grinding step.

2. The method of claim 1 wherein said preform further includes a tube of glass outwardly of said leachable glass for use during said step of heating and drawing, said tube glass being removed during said grinding of said sections into said spherical configurations.

3. The method according to claim 2 wherein said preform includes an additional glass intermediately of said rod of lens glass and leachable cladding, said additional glass being absorptive to light entering same and forming a permanent component of said lenses.

4. The method according to claim 1 wherein said lenses have oppositely disposed convex faces and are cut intermediately of said convex faces into shorter lengths.

5. The method according to claim 4 wherein faces resulting from said transaxial cutting are polished.

6. The method according to claim 1 wherein said step of grinding said sections to spherical configurations includes a first operation of rough abrading to approximate spherical shape and a final operation of lapping to final spherical shape.

7. The method according to claim 6 whereby said final operation is performed in a fashion similar to that used in the finishing of ball bearings.

* * * * *